United States Patent [19]
Azema

[11] Patent Number: 6,036,414
[45] Date of Patent: Mar. 14, 2000

[54] ELECTRIC SPINDLE HOLDER SLIDE FOR A HIGH-SPEED MACHINE TOOL

[75] Inventor: Andre Azema, Saix, France

[73] Assignee: Renault Automation, Boulogne-Billancourt, France

[21] Appl. No.: 09/117,283

[22] PCT Filed: Feb. 21, 1997

[86] PCT No.: PCT/FR97/00323

§ 371 Date: Nov. 5, 1998

§ 102(e) Date: Nov. 5, 1998

[87] PCT Pub. No.: WO97/30820

PCT Pub. Date: Aug. 28, 1997

[30]    Foreign Application Priority Data

Feb. 22, 1996 [FR]   France ................................... 96 02373

[51] Int. Cl.[7] ............................. B23C 9/00; B23B 39/00; F16C 17/00
[52] U.S. Cl. ..................... 409/231; 384/99; 408/239 R
[58] Field of Search ................................. 409/185, 231, 409/232; 408/129, 130, 238, 239 R, 124; 384/99; 160/222, 214

[56]            References Cited
            U.S. PATENT DOCUMENTS 3,516,328   6/1970   Jones et al. ............................... 409/231
4,560,289  12/1985   Wood, III .................................. 384/99
4,664,536   5/1987   Kamman .................................... 384/99
4,828,437   5/1989   Mukherjee et al. ..................... 409/231
5,056,971  10/1991   Sartori ................................. 409/231 X
5,350,263   9/1994   Fedeli ................................. 408/238 X
5,888,033   3/1999   Zagar et al. ......................... 408/124 X

FOREIGN PATENT DOCUMENTS 0 223 913   6/1987   European Pat. Off. .
2 543 032   9/1984   France .
61-252044  11/1986   Japan .
404176504   6/1992   Japan ..................................... 409/231
   197707   7/1977   U.S.S.R. ............................... 409/231

*Primary Examiner*—William Briggs
*Attorney, Agent, or Firm*—Oblon, Spivak, McClelland, Maier & Neustadt, P.C.

[57]            ABSTRACT

A carriage slide for an electric spindle of a high speed machine tool. A sealed chamber is defined between the surfaces of the slide which contact the spindle. Two ring-shaped seals are arranged between the contact surfaces so that the spindle can be filled with oil. The slide includes three inwardly projecting shoulders which form rings. The first outer shoulder at the inlet of the slide defines a greater opening diameter than the other two shoulders. The slide can be used in high speed machine tools.

12 Claims, 3 Drawing Sheets

ELECTRIC SPINDLE HOLDER SLIDE FOR A HIGH-SPEED MACHINE TOOL

BACKGROUND OF THE INVENTION

1. Field of the Invention

The present invention relates to the field of machine tools and more particularly to modifications with which high-speed machining of parts can be achieved under the best conditions.

2. Discussion of the Background

High-speed machining of parts in a machine tool generally takes place using a tool driven rotationally by the motor shaft of an electric spindle installed in a slide, which itself is mounted to be movable by translation along three axes X, Y and Z.

A machine tool is classically provided with three main working stations, to wit:

a machining station proper, provided with the tool driven rotationally by the motor shaft of the electric spindle and shaping the part to be machined, a drive station situated upstream from the machining station and comprising an assembly of mechanisms that ensure in particular the X, Y and Z displacements of the slide of the electric spindle as well as the supply of power to the electric spindle for rotation of its tool-carriage shaft, and a control station cooperating with the drive station and as a function of a program of instructions preestablished to take charge of the different phases of machining of the said part.

The Applicant has observed, during high-speed machining, that the rotation of the drive shaft of the electric spindle at extremely high speed, the contacts between the tool and the part to be machined, and the translational displacements of the slide of the electric spindle in the X, Y and Z directions are responsible in combination or individually for substantial vibrations of the assembly comprising slide and electric spindle. These vibrations are due in part to the fact that the operation of insertion of the electric spindle into the slide necessitates some mounting play between their contact surfaces, since clamping is takes place only on the front portion of the electric spindle, while the rear body of the electric spindle is not held directly in position. During the machining operations, therefore, vibrations develop which have harmful consequences for the internal elements of the electric spindle, resulting in shorter service life thereof.

SUMMARY OF THE INVENTION

The field of the invention relates more particularly to the process for mounting an electric spindle in a slide of a machine tool, said process comprising interposing an intermediate filling material between the contact surfaces of the electric spindle and the carriage slide thereof, for the purpose of damping the vibrations caused by high-speed rotation of the drive shaft of the said electric spindle and/or by the translational movements of the said slide and/or by the contacts of the tool with the part to be machined. The purpose of this intermediate material is to absorb the kinetic energy associated with the vibrations created by the high-speed movements of the shaft of the electric spindle and/or of the slide in order to limit the contacts and especially impacts between the electric spindle and the slide that can be harmful for the internal elements of those mechanisms.

The said intermediate material interposed between the contact surfaces of the said electric spindle and the said slide comprises oil which:

by virtue of its lubricating nature, does not cause corrosive attack of the mechanisms, by virtue of its fluid nature is capable of filling the gap, even of minimum size, necessary for assembly of the electric spindle, by virtue of its viscosity is a good damping agent.

Another advantage of interposing an oil film between the zones of contacts between the electric spindle and the slide is that, during the micro movements that are always present in a cylinder inserted into a bore, it prevents the development of "contact" corrosion, which would be extremely detrimental to the quality of the nested joint defined between the slide and the electric spindle.

The oil is trapped in a sealed chamber confined between the contact surfaces of the electric spindle and slide on the one hand and between two O-rings which seal the space separating the two contact surfaces on the other hand. Thus the electric spindle can be mounted in the slide without modification thereof, so that a standard electric spindle can be used. This characteristic makes it possible to use two O-rings, or in other words standard elements which, while suitable for ensuring sealing at the cylindrical surfaces, also provide initial damping between the contact surfaces of the electric spindle and the slide by virtue of their material, which is of rubbery nature.

The object of the invention is to provide a carriage slide for the electric spindle of a machine tool for high-speed machining of the type of that which creates a sealed chamber defined between its surfaces of contact with the electric spindle and two O-rings that ensure sealing between the said contact surfaces, so that the said chamber can be filled with oil in order to implement this type of mounting process. To this end, the slide is preferably formed with three successive recessed shoulders, the first exterior shoulder situated at the entrance to the slide defining an opening diameter larger than the opening diameter of the next two interior shoulders, such that the rear portion of the electric spindle can be introduced with play into the slide between the latter two shoulders and be flanged to the first shoulder. In this way the two O-rings providing sealing between the two contact surfaces of the electric spindle and of the slide, with which they define the volume of the said oil-filled, sealed chamber, can be held in position in two grooves machined in the inside faces of the second and third interior shoulders, such that the expanded region separating the second and third shoulders increases the volume of the said chamber.

BRIEF DESCRIPTION OF THE DRAWINGS

Although the invention has been outlined hereinabove in its most elementary form, other characteristics and other advantages will appear more clearly upon reading the description hereinafter of a preferred embodiment of a slide carriage for an electric spindle of a machine tool for high-speed machining in conformity with the fundamental concepts of the invention. This description will refer to the accompanying drawings, wherein:

FIGS. 3a and 3b are respectively a schematic view in section of the assembly comprising slide and electric spindle and an enlarged view of a detail of the drawing of FIG. 3a.

DETAILED DESCRIPTION OF THE PREFERRED EMBODIMENTS

Figure 1:
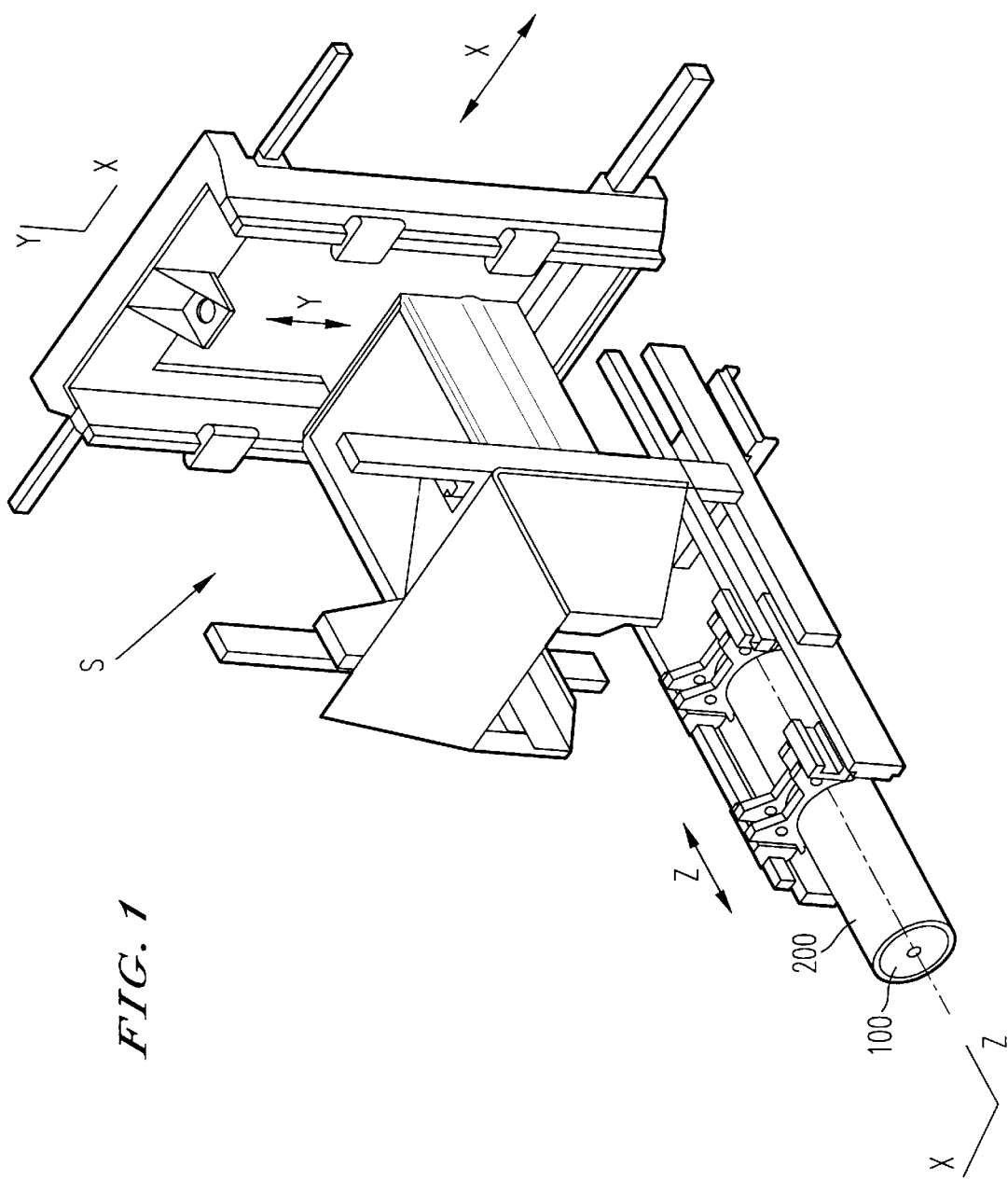
FIG. 1 is a cutaway perspective view illustrating the logical structure, which ensures translational displacements of a slide together with its electric spindle, of the frame of a machine tool for high-speed machining.

As illustrated in FIG. 1, the electric spindle denoted by 100 as a whole is fixed in a slide denoted by 200 as a whole, which in turn is mounted in a structure S organized logically to take charge of the high-speed displacements (arrows X, Y and Z) of the said slide 200. Such a logical structure was described and illustrated by the Applicant in French Patent Application No. 96.00912. These different reciprocating rectilinear displacements (arrows X, Y and Z) are ensured by means of linear motors appropriately arranged to ensure the movements of the movable mechanisms of the logical structure, and especially of the slide 200, under the best conditions.

Figure 2:
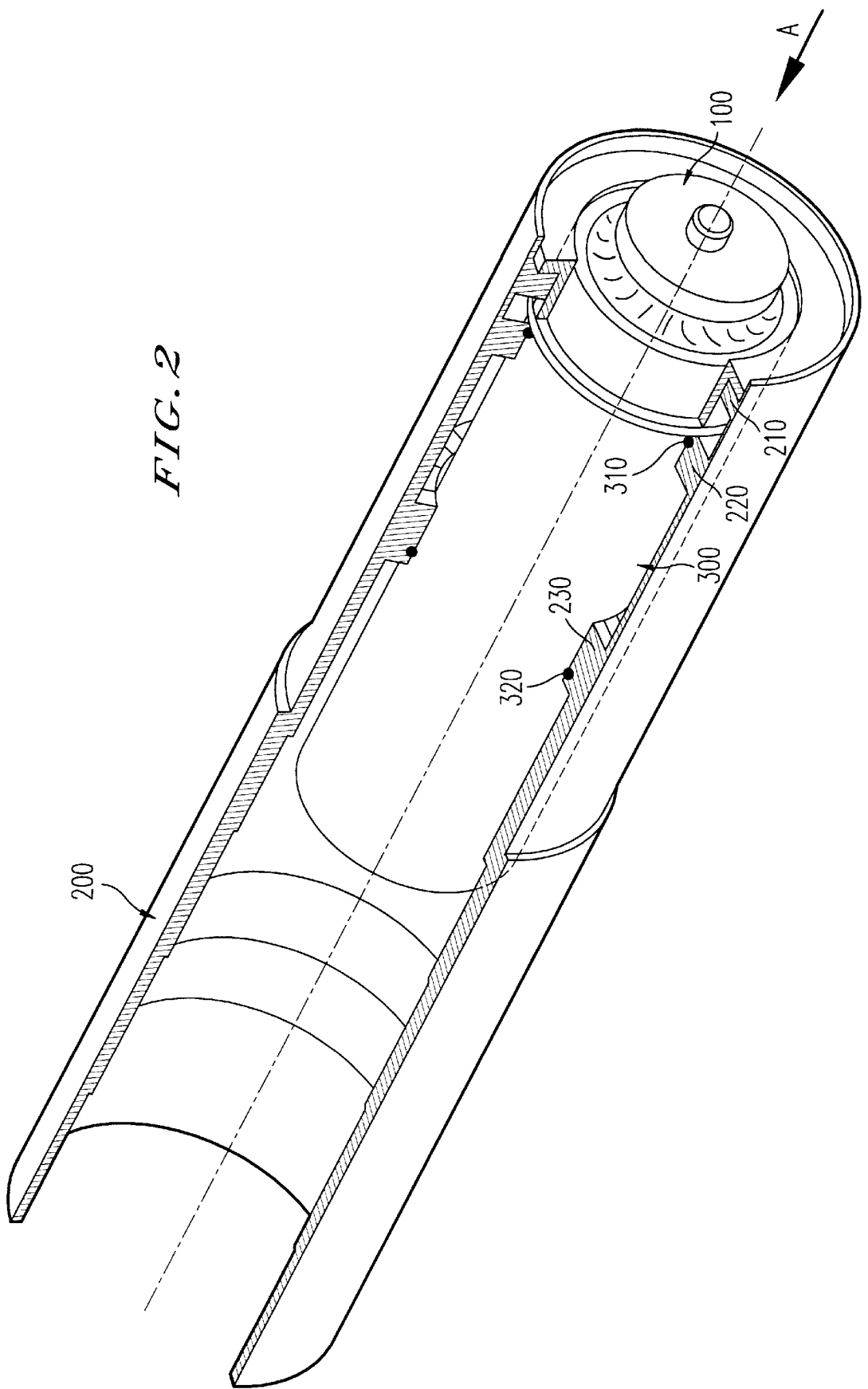
FIG. 2 is a partly exploded perspective view of the assembly comprising slide and electric spindle.

The internal front portion of the slide 200, illustrated with its electric spindle 100 on the drawing of FIG. 2, is provided with three recessed shoulders 210, 220 and 230 which are coaxial with the longitudinal axis ZZ' of the slide and which, forming collars, are disposed successively in the direction of penetration (arrow A) of the electric spindle 100 into the slide 200.

The first recessed shoulder 210, referred to as exterior shoulder because it is situated at the entrance to the slide 200, is drilled with threaded through holes 211 disposed parallel to the axis ZZ' and at uniform angular spacings. According to a particular arrangement of the invention, the inside diameter of the said exterior shoulder 210 is larger than the diameter of the bearing boss 110 with which the electric spindle 100 is equipped, so that the said bearing boss does not come into abutting relationship with the said shoulder when the electric spindle 100 is inserted (arrow A) into the slide 200.

The second recessed shoulder 220, referred to as the intermediate shoulder, has an inside diameter:

larger than that of the rear body 120 of the said electric spindle, equal to the inside diameter of the third recessed shoulder 230, referred to as interior shoulder, and, finally, smaller than that of the boss 110 of the electric spindle 100.

Thus the electric spindle 100 is mounted in the slide 200 by cylindrical penetration of the rear body 120 of the said electric spindle into the slide 200 in the direction of arrow A, such that the boss 110 is made to abut against the front face of the intermediate shoulder 220 of the slide, against which it is held in position by a flange 130, which flange 130 is provided with a front portion 130a traversing the exterior shoulder 210 and a rear portion 130b forming a rim that can be fixed adjustably on the external face of the exterior shoulder 210 of the slide 200, by means of bolts 21 la engaged in the threaded holes 211. This flanging method permits the slide 200 to communicate, to the electric spindle 100, all translational movements (arrows X, Y and Z) to which it is subjected by virtue of its mounting in the logical structure S (see FIG. 1). The keying of the electric spindle 100 to rotate with the slide 200 is achieved by means of pins, which are not illustrated because they do not add further to good understanding of the invention.

The inner cylindrical faces 221 and 231 of the two collars forming the intermediate and interior shoulders 220 and 230 respectively are recessed with channels 221a and 231a respectively in which there are seated two O-rings 310 and 320 of identical characteristics. The depth of these two channels 221a and 231a in which the O-rings 310 and 320 are seated is such that, while the electric spindle 100 is being inserted into the slide 200 in the direction of the arrow A, the rear body 120 of the said electric spindle comes into contact with the two O-rings 310 and 320, thus confining together with the contact surfaces of the electric spindle 100 and of the slide 200 a chamber 300. According to the fundamental concept of the invention, the purpose of this chamber 300 is to guarantee a sealed volume between the contact surfaces of the electric spindle 100 and of the slide 200, in order to receive and trap a material for filling the mounting play between the two mechanisms. This filling material, which preferably will comprise oil, serves to damp the numerous vibrations of the assembly comprising electric spindle 100 and slide 200.

Figures 3A, 3B:
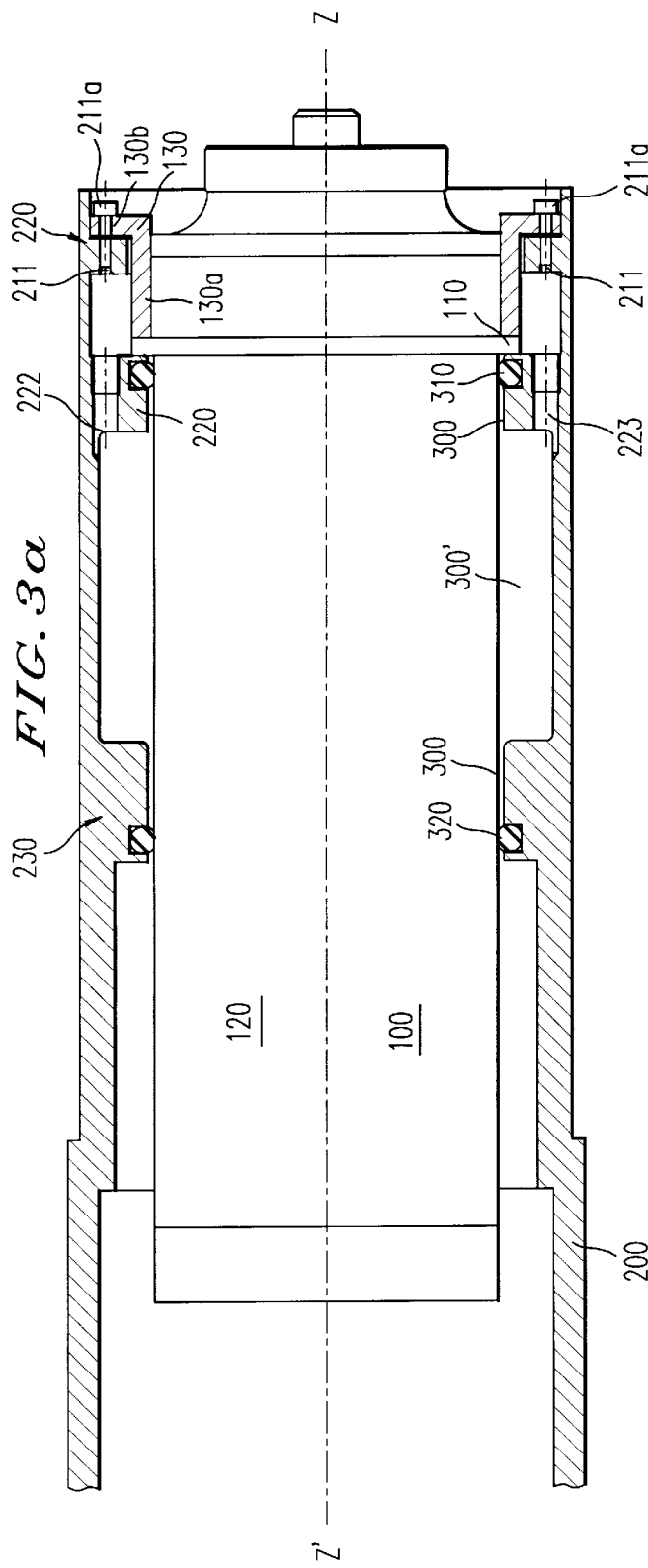

As shown in more detail in the drawing of FIG. 3b, the chamber 300 is provided with an expanded region 300', which is situated between the intermediate and interior shoulders 220 and 230 respectively of the slide 200 and is in communication with two ports 222 and 223 drilled in the thickness of the intermediate shoulder 220, the first defining an admission tube and the second an evacuation tube. This expanded region 300' offers the great advantage that it is not necessary to surface the length of the slide separating the two shoulders 220 and 230, that it permits a large volume of oil to fill the sealed chamber 300 and that it enables the drilling of tubes 222 and 223 in the intermediate shoulder 220, parallel to the axis ZZ'.

Advantageously, the two admission and evacuation tubes 222 and 223 respectively are disposed in diametrically opposite position, the first 222 being situated at the top of the slide 200 to function as vent in order to facilitate the evacuation of air during filling with oil and evacuation thereof from the said sealed chamber 300, and the second 223 being situated at the bottom of the slide 200 to ensure purging and refilling of the said sealed chamber 300 during any maintenance operation, such as change of the electric spindle 100, or replacement of the O-rings 310, 320 or of the oil.

According to a preferred embodiment of the invention, the O-rings 310 and 320 and therefore the channels 221a and 231a in which they are seated are disposed as far as possible from the expanded region 300' and therefore from each other, for the purpose of increasing the damping surface between the electric spindle 100 and the slide 200 as much as possible. In fact, it is important to recall that damping takes place as close as possible to the contact surfaces, or in other words within the limit of the thickness of the intermediate and interior shoulders 220 and 230 respectively, such that the portion of the chamber 300 filled with oil and functioning as damper is therefore limited by the inside edge of the shoulders bordering the expanded region 300' and the O-rings themselves. The distance between the channels 221a and 231a in which the O-rings are seated is therefore of predominant importance for good vibrational damping.

It is understood that the foregoing description and illustration of the mounting process and of the carriage slide for an electric spindle with which the said process can be implemented are provided for the purposes of disclosure and not of limitation. Obviously it will be possible to arrange, modify and improve the foregoing example in various ways without going beyond the scope of the invention considered in these broadest aspects.

I claim:

1. A carriage slide for an electric spindle of a machine tool for high-speed machining of the type of that which creates a sealed chamber defined between its surfaces of contact with the electric spindle and two O-rings that ensure sealing between the said contact surfaces, so that the said chamber can be filled with oil, CHARACTERIZED BY THE FACT THAT the said slide is formed with three successive shoulders forming collars, the first exterior shoulder situated at the entrance to the slide defining an opening diameter larger than the opening diameter of the next two intermediate and interior shoulders and respectively.

2. A carriage slide for an electric spindle according to claim 1, CHARACTERIZED BY THE FACT THAT the thickness of the collar forming the exterior shoulder of the said slide is drilled from one side to the other with threaded holes, which are parallel to the longitudinal axis of the slide and which, being disposed at regular angular spacing, permit a flange to be fixed by means of bolts in order to ensure clamping of the electric spindle inserted into the slide.

3. A carriage slide for an electric spindle according to claim 1, CHARACTERIZED BY THE FACT THAT the inner cylindrical faces of the intermediate and interior shoulders respectively of the said slide are recessed with two channels in which there are seated two O-rings providing sealing between the two surfaces of contact of the electric spindle and of the slide, with which they define the volume of a sealed chamber filled with oil, such that the region separating the said shoulders increases the volume of the said chamber.

4. A carriage slide for an electric spindle according to claim 1, CHARACTERIZED BY THE FACT THAT the thickness of the said intermediate shoulder of the slide is drilled from one side to the other with two ports and the axes of which are parallel to the axis of the slide and which, being in communication with the region of the said sealed chamber, define therein two tubes, one for admission and the other for evacuation of oil.

5. A carriage slide for an electric spindle according to claim 1, CHARACTERIZED BY THE FACT THAT the said O-rings and the channels in which they are seated are disposed as far as possible from the said region.

6. A carriage slide for an electric spindle according to claim 1, CHARACTERIZED BY THE FACT THAT the two admission and evacuation tubes and respectively are disposed in diametrically opposite position, the first being situated at the top of the slide to function as vent in order to facilitate the evacuation of air during filling with oil and evacuation thereof from the said sealed chamber, and the second being situated at the bottom of the slide to ensure purging and refilling of the said sealed chamber.

7. A carriage slide for an electric spindle according to claim 2, CHARACTERIZED BY THE FACT THAT the inner cylindrical faces of the intermediate and interior shoulders respectively of the said slide are recessed with two channels in which there are seated two O-rings providing sealing between the two surfaces of contact of the electric spindle and of the slide, with which they define the volume of a sealed chamber filled with oils; such that the region separating the said shoulders increases the volume of the said chamber.

8. A carriage slide for an electric spindle according to claim 2, CHARACTERIZED BY THE FACT THAT the thickness of said intermediate shoulder of the slide is drilled from one side to the other with two ports, the axes of which are parallel to the axis of the slide and which, being in communication with the region of said sealed chamber, define therein two tubes, one for admission and the other for evacuation of oil.

9. A carriage slide for an electric spindle according to claim 3, CHARACTERIZED BY THE FACT THAT the thickness of said intermediate shoulder of the slide is drilled from one side to the other with two ports, the axes of which are parallel to the axis of the slide and which, being in communication with the region of said sealed chamber, define therein two tubes, one for admission and the other for evacuation of oil.

10. A carriage slide for an electric spindle according to claim 2, CHARACTERIZED BY THE FACT THAT the said O-rings and the channels in which they are seated are disposed a maximum distance from the said region.

11. A carriage slide for an electric spindle according to claim 3, CHARACTERIZED BY THE FACT THAT the said O-rings and the channels in which they are seated are disposed a maximum distance from the said region.

12. A carriage slide for an electric spindle according to claim 4, CHARACTERIZED BY THE FACT THAT the said O-rings and the channels in which they are seated are disposed a maximum distance from the said region.

* * * * *